(12) United States Patent
Li et al.

(10) Patent No.: US 10,928,686 B2
(45) Date of Patent: Feb. 23, 2021

(54) ARRAY SUBSTRATE, LIQUID CRYSTAL DISPLAY PANEL AND DISPLAY DEVICE

(71) Applicant: Xianyang Caihong Optoelectronics Technology Co., Ltd, Xianyang (CN)

(72) Inventors: Zhuo Li, Xianyang (CN); Boqin Cui, Xianyang (CN)

(73) Assignee: XIANYANG CAIHONG OPTOELECTRONICS TECHNOLOGY CO., LTD, Xianyang (CN)

( * ) Notice: Subject to any disclaimer, the term of this patent is extended or adjusted under 35 U.S.C. 154(b) by 0 days.

(21) Appl. No.: 16/741,801

(22) Filed: Jan. 14, 2020

(65) Prior Publication Data

US 2020/0301215 A1 Sep. 24, 2020

(30) Foreign Application Priority Data

Mar. 22, 2019 (CN) .......................... 201910223989.5

(51) Int. Cl.
*G02F 1/1343* (2006.01)
*G02F 1/1333* (2006.01)
*G02F 1/1362* (2006.01)

(52) U.S. Cl.
CPC ...... *G02F 1/134309* (2013.01); *G02F 1/1362* (2013.01); *G02F 1/13439* (2013.01); *G02F 1/133345* (2013.01); *G02F 1/136218* (2021.01); *G02F 2201/121* (2013.01); *G02F 2201/123* (2013.01)

(58) Field of Classification Search
None
See application file for complete search history.

(56) References Cited

U.S. PATENT DOCUMENTS

| | | | |
|---|---|---|---|
| 8,258,556 B2* | 9/2012 | Lee | H01L 27/12 257/291 |
| 2010/0079419 A1* | 4/2010 | Shibusawa | H01L 27/3272 345/204 |
| 2012/0313103 A1* | 12/2012 | Yamada | H01L 27/14623 257/66 |
| 2017/0115522 A1* | 4/2017 | Mun | G02F 1/1368 |
| 2018/0069029 A1* | 3/2018 | Kawachi | G02F 1/1368 |
| 2018/0081245 A1* | 3/2018 | Xiao | G02F 1/136209 |
| 2018/0107053 A1* | 4/2018 | Shi | G02F 1/136209 |
| 2018/0129104 A1* | 5/2018 | Morimoto | G02F 1/133345 |
| 2019/0079626 A1* | 3/2019 | Liu | H01L 27/1214 |

* cited by examiner

*Primary Examiner* — Ryan Crockett
(74) *Attorney, Agent, or Firm* — WPAT, PC

(57) ABSTRACT

An array substrate, a liquid crystal display panel and a display device are provided. The array substrate includes: a substrate; a common electrode and a gate electrode, both disposed on the substrate; and a shielding electrode, disposed on the common electrode and the gate electrode, wherein an orthographic projection of the shielding electrode on the substrate is overlapped with an orthographic projection of the gate electrode on the substrate as well as an orthographic projection of the common electrode on the substrate, and the shielding electrode is electrically connected to the common electrode. In the embodiment of the disclosure, the shielding electrode is disposed on the common electrode and the gate electrode, so that the influence of the voltage difference formed by the gate electrode and the common electrode can be effectively shielded, thereby eliminating the phenomenon of push mura.

20 Claims, 2 Drawing Sheets

ARRAY SUBSTRATE, LIQUID CRYSTAL DISPLAY PANEL AND DISPLAY DEVICE

FIELD OF THE DISCLOSURE

The disclosure relates to a display technology field, and more particularly to an array substrate, a liquid crystal display panel and a display device.

BACKGROUND OF THE DISCLOSURE

With the development of display technology, flat display devices such as liquid crystal displays (LCDs) have advantages such as high image quality, power saving, thin body and wide application range. It is widely used in various consumer electronic products such as mobile phones, televisions, personal digital assistants, digital cameras, notebook computers, and desktop computers.

Most of the liquid crystal display devices on the market are manufacturing methods of a backlight type color film substrate, which include a liquid crystal display panel and a backlight module. Generally, a liquid crystal display panel includes a color filter (CF) substrate, an array substrate, and a liquid crystal (LC) sandwiched between the color filter substrate and the array substrate.

The liquid crystal display panel is subjected to pressure during the preparation or use, and the upper and lower substrates may be misaligned after the surface of the liquid crystal display panel is subjected to pressure. Moreover, since the photo spacer (PS) has insufficient elastic restoring force or cannot be reset by the side groove of the array substrate, the misalignment does not disappear after the pressure on the surface of the liquid crystal display panel disappears. At this time, part of the gate electrode and the common electrode are exposed at the opening area of the CF, and the liquid crystal between the gate electrode and the common electrode in the dark state is deflected by the voltage difference between the gate electrode and the common electrode. As a result, the position is bright, and there is a visually obvious light leakage phenomenon.

SUMMARY OF THE DISCLOSURE

In order to solve the above problems in the prior art, the disclosure provides an array substrate, a liquid crystal display panel, and a display device. The technical problem to be solved by the disclosure is achieved by the following technical solutions:

an array substrate, including:

a substrate;

a common electrode and a gate electrode, both disposed on the substrate; and a shielding electrode, disposed on the common electrode and the gate electrode, wherein an orthographic projection of the shielding electrode on the substrate is overlapped with an orthographic projection of the gate electrode on the substrate as well as an orthographic projection of the common electrode on the substrate, and the shielding electrode is electrically connected to the common electrode.

In one embodiment of the disclosure, the array substrate further includes a passivation layer, located between the shielding electrode and the common electrode.

In one embodiment of the disclosure, the array substrate further includes an insulating layer, located between the common electrode and the gate electrode; wherein the passivation layer is provided with a via structure, and the common electrode and the shielding electrode are electrically connected with each other through the via structure.

In one embodiment of the disclosure, the array substrate further includes an insulating layer, located between the shielding electrode and the common electrode; wherein the passivation layer and the insulating layer are provided with a via structure, and the common electrode and the shielding electrode are electrically connected with each other through the via structure; wherein the common electrode is disposed in a same layer as the gate electrode.

In one embodiment of the disclosure, the common electrode and the shielding electrode are made from different materials respectively.

In one embodiment of the disclosure, the array substrate further includes a pixel electrode, disposed in a same layer as the shielding electrode and insulated from the shielding electrode.

In one embodiment of the disclosure, the pixel electrode and the shielding electrode are made from a same material.

In one embodiment of the disclosure, the pixel electrode and the shielding electrode are made from indium tin oxide (ITO).

The embodiment of the disclosure further provides a liquid crystal display panel, which includes the array substrate according to any one of the above.

The embodiment of the disclosure further provides a display device, which includes the liquid crystal display panel described above.

The beneficial effects of the disclosure:

1. In the embodiment of the disclosure, the shielding electrode is disposed on the common electrode and the gate electrode, and the orthographic projection of the shielding electrode on the substrate is overlapped with the orthographic projection of the gate electrode on the substrate as well as the orthographic projection of the common electrode on the substrate such that the orthographic projection of the shielding electrode on the substrate can simultaneously overlap the orthographic projection of the gate electrode on the substrate and the orthographic projection of the common electrode on the substrate. At the same time, the shielding electrode is also electrically connected to the common electrode, so that the voltage of the shielding electrode is the same as the voltage of the common electrode, so that the voltage of the gate electrode can be shielded, and there is no voltage difference between the shielding electrode and the CF substrate. In the case where the upper and lower substrates of the liquid crystal display panel are displaced by the pressure, the liquid crystal at the position of the shielding electrode can maintain the vertical state without the influence of the voltage difference, and there is no light leakage, which can improve the effect of the push mura.

2. The embodiment of the disclosure provides the via structure on the passivation layer. The via structure penetrates through the passivation layer, so that the common electrode and the shielding electrode are electrically connected through the via structure, so that the voltage of the shielding electrode and the voltage of the common electrode are the same, and there is no voltage difference between the shielding electrode and the CF substrate. By providing the via structure on the passivation layer, the processing process is simple and easy to implement, and at the same time, the protection effect of the passivation layer on the electrical properties of the common electrode and the shielding electrode can be ensured.

3. The shielding electrode of the embodiment of the disclosure is disposed in the same layer as the pixel electrode. Therefore, in the preparation process, the pattern of the shielding electrode and the pattern of the pixel electrode can be formed by one patterning process without adding a new preparation process. It can be realized only by changing the pattern of the corresponding film layer, which simplifies the process steps, saves production costs and improves production efficiency.

The disclosure will be further described in detail below with reference to the accompanying drawings and embodiments.

DETAILED DESCRIPTION OF EMBODIMENTS

The disclosure will be further described in detail below with reference to specific embodiments, but the embodiments of the disclosure are not limited thereto.

Embodiment 1

Figure 1:
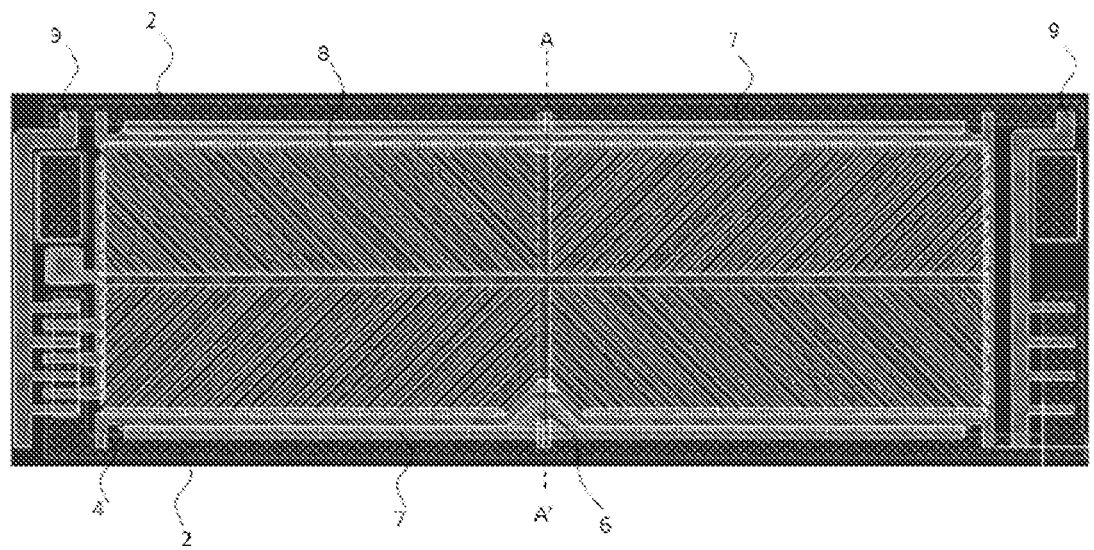
FIG. 1 is a schematic view of an array substrate according to an embodiment of the disclosure.
Figure 2:
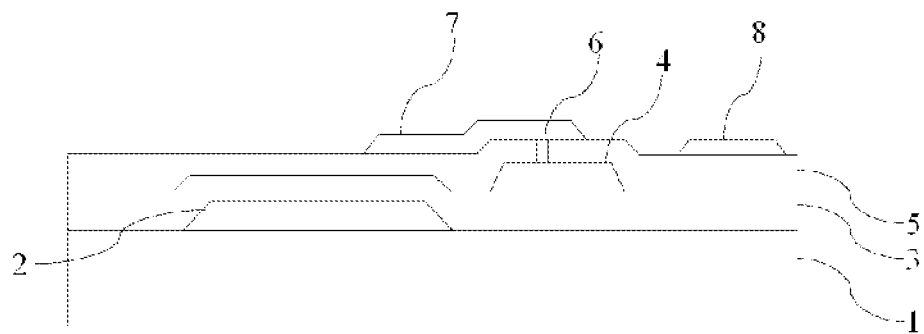
FIG. 2 is a partial schematic sectional view of the array substrate of FIG. 1 taken along A-A line according to the embodiment of the disclosure.

Please see FIG. 1 and FIG. 2, FIG. 1 is a schematic view of an array substrate according to an embodiment of the disclosure, FIG. 2 is a partial schematic view of the array substrate of FIG. 1 taken along A-A line according to the embodiment of the disclosure. The embodiment of the disclosure provides an array substrate, and the array substrate provided by the embodiment includes:

a substrate 1;

a common electrode 4 and a gate electrode 2, wherein the common electrode 4 and the gate electrode 2 are disposed on the substrate 1; and a shielding electrode 7 disposed on the common electrode 4 and the gate electrode 2, wherein an orthographic projection of the shielding electrode 7 on the substrate 1 is overlapped with an orthographic projection of the gate electrode 2 on the substrate 1 as well as an orthographic projection of the common electrode 4 on the substrate 1, and the shielding electrode 7 is electrically connected to the common electrode 4.

In the embodiment of the disclosure, the shielding electrode 7 is disposed on the common electrode 4 and the gate electrode 2, and the orthographic projection of the shielding electrode 7 on the substrate 1 is overlapped with the orthographic projection of the gate electrode 2 on the substrate 1 as well as the orthographic projection of the common electrode 4 on the substrate 1 such that the orthographic projection of the shielding electrode 7 on the substrate 1 can simultaneously overlap the orthographic projection of the gate electrode 2 on the substrate 1 and the orthographic projection of the common electrode 4 on the substrate 1. At the same time, the shielding electrode 7 is also electrically connected to the common electrode 4, so that the voltage of the shielding electrode 7 is the same as the voltage of the common electrode 4, so that the voltage of the gate electrode 2 can be shielded, and there is no voltage difference between the shielding electrode 7 and the CF substrate. In the case where the upper and lower substrates of the liquid crystal display panel are displaced by the pressure, the liquid crystal at the position of the shielding electrode 7 can maintain the vertical state without the influence of the voltage difference, and there is no light leakage, which can improve the effect of the push mura.

Specifically, the material of the substrate 1 may be a semiconductor material such as glass or quartz, or may be an organic polymer or the like.

The gate electrode 2 is configured to receive the gate electrode voltage and control the on or off of the source and the drain of the thin film transistor under the control of the gate electrode voltage.

In addition, the material of the gate electrode 2 is not limited in the embodiment of the disclosure, and the material of the gate electrode 2 may be a conductive material. The material of the gate electrode 2 may include a copper-based metal such as copper (Cu), copper-molybdenum alloy (Cu/Mo), copper-titanium alloy (Cu/Ti), copper-molybdenum-titanium alloy (Cu/Mo/Ti), copper-molybdenum-tungsten alloy (Cu/Mo/W), copper-molybdenum-niobium alloy (Cu/Mo/Nb), or the like; the material of the gate electrode 2 may also be a chromium-based metal, such as a chromium-molybdenum alloy (Cr/Mo), a chromium-titanium alloy (Cr/Ti), a chromium-molybdenum-titanium alloy (Cr/Mo/Ti), or the like; the material of the gate electrode 2 may also be aluminum or aluminum alloy or the like.

The common electrode 4 is used for inputting a common signal, and supplies a common voltage to the pixel electrode 8, thereby providing a bias voltage for the corresponding liquid crystal in the liquid crystal display panel to form an electric field to drive the liquid crystal molecules of the liquid crystal layer to rotate.

Specifically, the shielding electrode 7 of the embodiment of the disclosure is used for electrically connecting with the common electrode 4, and the voltage of the shielding electrode 7 and the voltage of the common electrode 4 are the same, so that there is no voltage difference between the shielding electrode 7 and the CF substrate. And the orthographic projection of the shielding electrode 7 on the substrate 1 is overlapped with the orthographic projection of the gate electrode 2 on the substrate 1 as well as the orthographic projection of the common electrode 4 on the substrate 1 so as to function to shield the voltage of the gate electrode 2. Therefore, when the upper and lower substrates of the liquid crystal display panel are misaligned by the pressure, the liquid crystal between the gate electrode and the common electrode is not affected by the voltage difference, so that the vertical state can be maintained without leaking light.

The shielding electrode 7 is different from the material of the common electrode 4, wherein the common electrode 4 is generally metal, and the material of the shielding electrode 7 may be ITO (indium tin oxide), or may be AZO (aluminum zinc oxide) or the like.

Preferably, the material of the shielding electrode 7 is ITO, wherein the ITO has good chemical stability, thermal stability and good graphic processing characteristics. The shielding electrode 7 is different from the material of the common electrode 4, and it is possible to further ensure that there is no voltage difference between the shielding electrode 7 and the CF substrate, and no light leakage occurs, further improving the purpose of the push mura.

Preferably, for one pixel, the shielding electrode 7 should be added to the wide side of its corresponding pixel (the pixel includes a long side and a wide side, wherein the size of the wide side is larger than the size of the long side). Since the wide side of the pixel is the most leaky and the wide side occupies the largest proportion of light leakage, the shielding electrode 7 is added to the wide side of the corresponding pixel, which can more effectively improve the light leakage phenomenon.

The array substrate of the embodiment of the disclosure further includes a passivation layer 5 between the shielding electrode 7 and the common electrode 4, in order to better achieve the phenomenon of preventing light leakage. The passivation layer 5 serves to reduce the influence of defects which may be in the common electrode 4 on the electrical properties of the shielding electrode 7 or the influence of defects which may be in the shielding electrode 7 on the electrical properties of the common electrode 4. The shielding electrode 7 and the common electrode 4 are also electrically connected through the passivation layer 5. Therefore, when the passivation layer 5 ensures the electrical properties of the common electrode 4 and the shielding electrode 7, it is also possible to ensure that there is no voltage difference between the shielding electrode 7 and the CF substrate, thereby further optimizing the effect of improving the push mura.

In addition, the material of the passivation layer 5 is not limited in the embodiment of the disclosure, and may be, for example, silicon nitride, silicon oxide or silicon oxynitride.

Further, the passivation layer 5 is provided with the via structure 6. The common electrode 4 and the shielding electrode 7 are electrically connected through the via structure 6, and the via structure 6 penetrates through the passivation layer 5, so that the common electrode 4 and the shielding electrode 7 are electrically connected. The voltage of the shielding electrode 7 is made the same as the voltage of the common electrode 4, and there is no voltage difference between the shielding electrode 7 and the CF substrate. When the upper and lower substrates of the liquid crystal display panel are displaced by the pressure, no light leakage occurs. The manner in which the via structure 6 is provided in the passivation layer 5 is simple and easy to implement, and at the same time, the protection effect of the passivation layer 5 on the electrical properties of the common electrode 4 and the shielding electrode 7 can be ensured.

In addition, the embodiment of the disclosure does not limit the size of the via structure 6, and may be, for example, 3-10 mm.

Further, the array substrate of the embodiment of the disclosure further includes an insulating layer 3 between the common electrode 4 and the gate electrode 2. The insulating layer 3 serves to isolate the common electrode 4 and the gate electrode 2 such that electrical insulation is formed between the common electrode 4 and the gate electrode 2.

Figure 3:
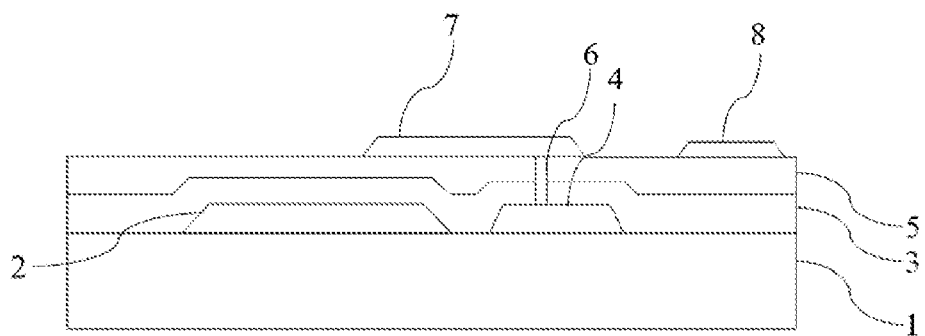
FIG. 3 is a partial schematic sectional view of another arrangement manner of the insulating layer in the embodiment of the present disclosure.

In addition, the arrangement of insulating layer 3 is not limited in the embodiment of the disclosure, please refer to FIG. 3, the insulating layer 3 may disposed between the shielding electrode 7 and the common electrode 4, herein the common electrode 4 is disposed in the same layer as the gate electrode 2, and the via structure 6 penetrates through the passivation layer 5 and the insulating layer 3, so that the common electrode 4 and the shielding electrode 7 are electrically connected.

In addition, the material of the insulating layer 3 is not limited in the embodiment of the disclosure, and may be, for example, silicon nitride, or other materials such as silicon oxide and silicon oxynitride.

Further, the array substrate of the embodiment of the disclosure further includes a pixel electrode 8 for applying an electric field to control the degree of rotation of the liquid crystal molecules to perform a display operation. For example, the gate electrode of the thin film transistor of each pixel unit is electrically connected or integrally formed with the corresponding gate line, and the source electrode is electrically connected or integrally formed with the corresponding data line, and the drain electrode is electrically connected or integrally formed with the corresponding pixel electrode.

The pixel electrode 8 is disposed in the same layer as the shielding electrode 7 and insulated from the shielding electrode 7, and the pixel electrode 8 and the common electrode 4 are insulated by the passivation layer 5. Thereby, the influence of the defects which may be in the common electrode 4 on the electrical properties of the pixel electrode 8 or the defects which may be in the pixel electrode 8 on the electrical properties of the common electrode 4 are eliminated. The shielding electrode 7 is disposed in the same layer as the pixel electrode 8, so that in the preparation, the pattern of the shielding electrode 7 and the pattern of the pixel electrode 8 can be formed by one patterning process. No need to add a new preparation process, only need to change the pattern of the corresponding film layer can be achieved, simplifying the process steps, saving production costs and improving production efficiency.

In order to facilitate the preparation of the shielding electrode 7, the shielding electrode 7 and the pixel electrode 8 may be provided in the same material, for example, either ITO or AZO.

Preferably, the material of the shielding electrode 7 and the pixel electrode 8 is ITO.

The gate electrode 3 of the embodiment of the disclosure belongs to a thin film transistor (TFT), and the thin film transistor includes a source electrode, a drain electrode, an active layer, a gate electrode 2, and an insulating layer 3. The source electrode, the drain electrode, and the active layer are disposed in the same layer, and are all located on the insulating layer 3.

Figure 4:
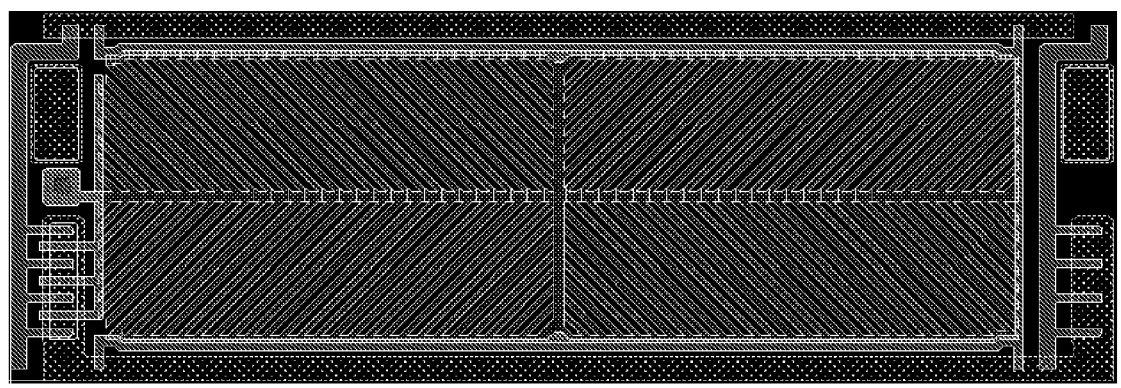
FIG. 4 is a schematic structural view of a conventional array substrate.

See FIG. 4, FIG. 4 is a schematic structural view of a conventional array substrate. At present, most of the liquid crystal display panels have a pixel aspect ratio of 3:1, and the pixels are arranged in a vertical arrangement. Wherein the number of Source IC pins is three times the number of Gate IC pins, so multiple Source ICs are needed. In order to reduce costs, some products will use Tri-gate (three-dimensional transistor) design. For example, a 32-inch liquid crystal display panel using Tri-gate technology has a pixel aspect ratio of 1:3, and the pixels are arranged in a row, which can save ⅔ of the Source IC, which is more cost-effective than the common design. However, for the liquid crystal display panel using the Tri-gate technology, the area of the bright area in the tri-gate design is three times that of the ordinary design, and there is a visually obvious phenomenon of push mura.

The structure of the array substrate of the embodiment of the disclosure is more effective for improving the light leakage phenomenon of the liquid crystal display panel designed by the Tri-gate method. The liquid crystal display panel designed by the Tri-gate method can effectively improve the light leakage phenomenon when the upper and lower substrates of the liquid crystal display panel are displaced by the pressure.

It is apparent that those skilled in the art can make various modifications and variations to the disclosure without departing from the spirit and scope of the disclosure. Thus, it is intended that the disclosure cover the modifications and modifications of the disclosure.

Embodiment 2

The embodiment of the disclosure further provides a liquid crystal display panel, which includes the above array substrate provided by the embodiment of the disclosure. Referring to FIG. 2, the array substrate of the liquid crystal display panel includes:

a substrate 1;

a common electrode 4 and a gate electrode 2, wherein the common electrode 4 and the gate electrode 2 are disposed on the substrate 1; and a shielding electrode 7 disposed on the common electrode 4 and the gate electrode 2, wherein an orthographic projection of the shielding electrode 7 on the substrate 1 is overlapped with an orthographic projection of the gate electrode 2 on the substrate 1 as well as an orthographic projection of the common electrode 4 on the substrate 1, and the shielding electrode 7 is electrically connected to the common electrode 4.

The array substrate further includes a passivation layer 5 between the shielding electrode 7 and the common electrode 4.

Further, the passivation layer 5 is provided with a via structure 6, and the common electrode 4 and the shielding electrode 7 are electrically connected through the via structure 6.

Further, the common electrode 4 is different from the material of the shielding electrode 7.

Further, the array substrate further includes an insulating layer 3 between the common electrode 4 and the gate electrode 2.

Further, the array substrate further includes a pixel electrode 8 disposed in the same layer as the shielding electrode 7 and insulated from the shielding electrode 7.

Further, the pixel electrode is the same material as the shielding electrode.

Further, the material of the pixel electrode and the shielding electrode is ITO.

In the embodiment of the disclosure, the shielding electrode 7 is disposed on the common electrode 4 and the gate electrode 2, and the orthographic projection of the shielding electrode 7 on the substrate 1 is overlapped with the orthographic projection of the gate electrode 2 on the substrate 1 as well as the orthographic projection of the common electrode 4 on the substrate 1 such that the orthographic projection of the shielding electrode 7 on the substrate 1 can simultaneously overlap the orthographic projection of the gate electrode 2 on the substrate 1 and the orthographic projection of the common electrode 4 on the substrate 1. At the same time, the shielding electrode 7 is also electrically connected to the common electrode 4, so that the voltage of the shielding electrode 7 is the same as the voltage of the common electrode 4, so that the voltage of the gate electrode 2 can be shielded, and there is no voltage difference between the shielding electrode 7 and the CF substrate. In the case where the upper and lower substrates of the liquid crystal display panel are displaced by the pressure, the liquid crystal at the position of the shielding electrode 7 can maintain the vertical state without the influence of the voltage difference, and there is no light leakage, which can improve the effect of the push mura.

Further, the passivation layer 5 is provided with the via structure 6. The common electrode 4 and the shielding electrode 7 are electrically connected through the via structure 6, and the via structure 6 penetrates through the passivation layer 5, so that the common electrode 4 and the shielding electrode 7 are electrically connected. The voltage of the shielding electrode 7 is made the same as the voltage of the common electrode 4, and there is no voltage difference between the shielding electrode 7 and the CF substrate. When the upper and lower substrates of the liquid crystal display panel are displaced by the pressure, no light leakage occurs. The manner in which the via structure 6 is provided in the passivation layer 5 is simple and easy to implement, and at the same time, the protection effect of the passivation layer 5 on the electrical properties of the common electrode 4 and the shielding electrode 7 can be ensured.

In addition, the arrangement of insulating layer 3 is not limited in the embodiment of the disclosure, please refer to FIG. 3, the insulating layer 3 may disposed between the shielding electrode 7 and the common electrode 4, herein the common electrode 4 is disposed in the same layer as the gate electrode 2, and the via structure 6 penetrates through the passivation layer 5 and the insulating layer 3, so that the common electrode 4 and the shielding electrode 7 are electrically connected.

Moreover, the shielding electrode 7 is disposed in the same layer as the pixel electrode 8, so that in the preparation, the pattern of the shielding electrode 7 and the pattern of the pixel electrode 8 can be formed by one patterning process. No need to add a new preparation process, only need to change the pattern of the corresponding film layer can be achieved, simplifying the process steps, saving production costs and improving production efficiency.

Other essential components of the liquid crystal display panel of the disclosure are understood by those skilled in the art, and are not described herein, nor should they be construed as limiting the disclosure. For the implementation of the liquid crystal display panel, refer to the embodiment of the above array substrate, and the repeated description is omitted.

Embodiment 3

The embodiment of the disclosure further provides a display device including the above liquid crystal display panel provided by the embodiment of the disclosure. The display device can be any product or component having a display function, such as a mobile phone, a tablet computer, a television, a notebook computer, a digital photo frame, a navigator, and the like. The array substrate of the liquid crystal display panel includes:

a substrate 1;

a common electrode 4 and a gate electrode 2, wherein the common electrode 4 and the gate electrode 2 are disposed on the substrate 1; and a shielding electrode 7 disposed on the common electrode 4 and the gate electrode 2, wherein an orthographic projection of the shielding electrode 7 on the substrate 1 is overlapped with an orthographic projection of the gate electrode 2 on the substrate 1 as well as an orthographic projection of the common electrode 4 on the substrate 1, and the shielding electrode 7 is electrically connected to the common electrode 4.

The array substrate further includes a passivation layer 5 between the shielding electrode 7 and the common electrode 4.

Further, the passivation layer 5 is provided with a via structure 6, and the common electrode 4 and the shielding electrode 7 are electrically connected through the via structure 6.

Further, the common electrode 4 is different from the material of the shielding electrode 7.

Further, the array substrate further includes an insulating layer 3 between the common electrode 4 and the gate electrode 2.

Further, the array substrate further includes a pixel electrode 8 disposed in the same layer as the shielding electrode 7 and insulated from the shielding electrode 7.

Further, the pixel electrode is the same material as the shielding electrode.

Further, the material of the pixel electrode and the shielding electrode is ITO.

In the embodiment of the disclosure, the shielding electrode 7 is disposed on the common electrode 4 and the gate electrode 2, and the orthographic projection of the shielding electrode 7 on the substrate 1 is overlapped with the orthographic projection of the gate electrode 2 on the substrate 1 as well as the orthographic projection of the common electrode 4 on the substrate 1 such that the orthographic projection of the shielding electrode 7 on the substrate 1 can simultaneously overlap the orthographic projection of the gate electrode 2 on the substrate 1 and the orthographic projection of the common electrode 4 on the substrate 1. At the same time, the shielding electrode 7 is also electrically connected to the common electrode 4, so that the voltage of the shielding electrode 7 is the same as the voltage of the common electrode 4, so that the voltage of the gate electrode 2 can be shielded, and there is no voltage difference between the shielding electrode 7 and the CF substrate. In the case where the upper and lower substrates of the liquid crystal display panel are displaced by the pressure, the liquid crystal at the position of the shielding electrode 7 can maintain the vertical state without the influence of the voltage difference, and there is no light leakage, which can improve the effect of the push mura.

Further, the passivation layer 5 is provided with the via structure 6. The common electrode 4 and the shielding electrode 7 are electrically connected through the via structure 6, and the via structure 6 penetrates through the passivation layer 5, so that the common electrode 4 and the shielding electrode 7 are electrically connected. The voltage of the shielding electrode 7 is made the same as the voltage of the common electrode 4, and there is no voltage difference between the shielding electrode 7 and the CF substrate. When the upper and lower substrates of the liquid crystal display panel are displaced by the pressure, no light leakage occurs. The manner in which the via structure 6 is provided in the passivation layer 5 is simple and easy to implement, and at the same time, the protection effect of the passivation layer 5 on the electrical properties of the common electrode 4 and the shielding electrode 7 can be ensured.

In addition, the arrangement of insulating layer 3 is not limited in the embodiment of the disclosure, please refer to FIG. 3, the insulating layer 3 may disposed between the shielding electrode 7 and the common electrode 4, herein the common electrode 4 is disposed in the same layer as the gate electrode 2, and the via structure 6 penetrates through the passivation layer 5 and the insulating layer 3, so that the common electrode 4 and the shielding electrode 7 are electrically connected.

Moreover, the shielding electrode 7 is disposed in the same layer as the pixel electrode 8, so that in the preparation, the pattern of the shielding electrode 7 and the pattern of the pixel electrode 8 can be formed by one patterning process. No need to add a new preparation process, only need to change the pattern of the corresponding film layer can be achieved, simplifying the process steps, saving production costs and improving production efficiency.

Other indispensable components of the display device of the disclosure are understood by those skilled in the art, and are not described herein, nor should they be construed as limiting the disclosure. For the implementation of the display device, reference may be made to the embodiment of the liquid crystal display panel described above, and the repeated description is omitted.

In the description of the disclosure, it is to be understood that the orientation or positional relationship of the terms "center", "longitudinal", "transverse", "length", "width", "thickness", "up", "down", "before", "after", "left", "right", "vertical", "horizontal", "top", "bottom", "inside", "outside", "clockwise", "counter clockwise" and the like is based on the orientation or positional relationship shown in the drawings, and is merely for convenience of description of the disclosure and simplified description. Instead of indicating or implying that the device or component referred to must have a particular orientation, constructed and operated in a particular orientation, it is not to be construed as limiting the disclosure.

Moreover, the terms "first" and "second" are used for descriptive purposes only and are not to be construed as indicating or implying a relative importance or implicitly indicating the number of technical features indicated. Thus, features defining "first" and "second" may include one or more of the features either explicitly or implicitly. In the description of the disclosure, the meaning of "a plurality" is two or more unless specifically and specifically defined otherwise.

In the disclosure, the first feature "on" or "under" the second feature may include direct contact of the first and second features, unless otherwise explicitly stated and defined. It may also be included that the first and second features are not in direct contact but are contacted by additional features between them. Moreover, the first feature "above" and "on" the second feature includes the first feature directly above and above the second feature, or merely indicating that the first feature level is higher than the second feature. The first feature "below" and "under" the second feature includes the first feature directly below and below the second feature, or merely the first feature level being less than the second feature.

In the description of this specification, the description of the terms "one embodiment", "some embodiments", "examples", "specific examples", "an example" or the like means that the specific features, structures, materials, or characteristics described in connection with the embodiments or examples are included in at least one embodiment or example of the disclosure. In the specification, the schematic representation of the above terms is not necessarily directed to the same embodiment or example. Furthermore, the particular features, structures, materials, or characteristics described may be combined in a suitable manner in any one or more embodiments or examples. Further, various embodiments or examples described in this specification can be joined and combined by those skilled in the art.

The above is a further detailed description of the disclosure in connection with the specific preferred embodiments, and the specific embodiments of the disclosure are not limited to the description. It will be apparent to those skilled in the art that the disclosure may be made without departing from the spirit and scope of the disclosure.

What is claimed is:

1. An array substrate with a pixel electrode, wherein a cross-section of the array substrate taken along a line in a widthwise direction of the pixel electrode comprises:
   a substrate;
   a common electrode and a gate electrode, both disposed on the substrate, wherein the common electrode and the gate electrode are spaced from each other in the widthwise direction of the pixel electrode to thereby form a spacing therebetween; and a shielding electrode, disposed on the common electrode and the gate electrode, wherein an orthographic projection of a first end of the shielding electrode on the substrate is overlapped with an orthographic projection of the gate electrode on the substrate, another orthographic projection of a second end opposite to the first end of the shielding electrode on the substrate is overlapped with an orthographic projection of the common electrode on the substrate, and thereby the spacing is covered by the shielding electrode; and the shielding electrode is electrically connected to the common electrode.

2. The array substrate according to claim 1, further comprising:

a passivation layer, located between the shielding electrode and the common electrode.

3. The array substrate according to claim 2, further comprising:

an insulating layer, located between the common electrode and the gate electrode;

wherein the passivation layer is provided with a via structure, and the common electrode and the shielding electrode are electrically connected with each other through the via structure.

4. The array substrate according to claim 2, further comprising:

an insulating layer, located between the shielding electrode and the common electrode;

wherein the passivation layer and the insulating layer are provided with a via structure, and the common electrode and the shielding electrode are electrically connected with each other through the via structure;

wherein the common electrode is disposed in a same layer as the gate electrode.

5. The array substrate according to claim 1, wherein the common electrode and the shielding electrode are made from different materials respectively.

6. The array substrate according to claim 1, wherein the pixel electrode is disposed in a same layer as the shielding electrode and insulated from the shielding electrode.

7. The array substrate according to claim 6, wherein the pixel electrode and the shielding electrode are made from a same material.

8. The array substrate according to claim 7, wherein the pixel electrode and the shielding electrode are made from indium tin oxide (ITO).

9. A liquid crystal display panel, comprising an array substrate with a pixel electrode;

wherein a cross-section of the array substrate taken along a line in a widthwise direction of the pixel electrode comprises:

a substrate;

a common electrode and a gate electrode, both disposed on the substrate, wherein the common electrode and the gate electrode are spaced from each other in the widthwise direction of the pixel electrode to thereby form a spacing therebetween; and a shielding electrode, disposed on the common electrode and the gate electrode, wherein an orthographic projection of a first end of the shielding electrode on the substrate is overlapped with an orthographic projection of the gate electrode on the substrate, another orthographic projection of a second end opposite to the first end of the shielding electrode on the substrate is overlapped with an orthographic projection of the common electrode on the substrate, and thereby the spacing is covered by the shielding electrode; and the shielding electrode is electrically connected to the common electrode.

10. The liquid crystal display panel according to claim 9, wherein the array substrate further comprises:

a passivation layer, located between the shielding electrode and the common electrode.

11. The liquid crystal display panel according to claim 10, further comprising:

an insulating layer, located between the common electrode and the gate electrode;

wherein the passivation layer is provided with a via structure, and the common electrode and the shielding electrode are electrically connected with each other through the via structure.

12. The array substrate according to claim 10, further comprising:

an insulating layer, located between the shielding electrode and the common electrode;

wherein the passivation layer and the insulating layer are provided with a via structure, and the common electrode and the shielding electrode are electrically connected with each other through the via structure;

wherein the common electrode is disposed in a same layer as the gate electrode.

13. The liquid crystal display panel according to claim 9, wherein the common electrode and the shielding electrode are made from different materials respectively.

14. The liquid crystal display panel according to claim 9, wherein the pixel electrode is disposed in a same layer as the shielding electrode and insulated from the shielding electrode.

15. The liquid crystal display panel according to claim 14, wherein the pixel electrode and the shielding electrode are made from a same material.

16. The liquid crystal display panel according to claim 15, wherein the pixel electrode and the shielding electrode are made from indium tin oxide (ITO).

17. A display device, comprising a liquid crystal display panel;

wherein the liquid crystal display panel comprises an array substrate with a pixel electrode, and a cross-section of the array substrate taken along a line in a widthwise direction of the pixel electrode comprises:

a substrate;

a common electrode and a gate electrode, both disposed on the substrate, wherein the common electrode and the gate electrode are spaced from each other in the widthwise direction of the pixel electrode to thereby form a spacing therebetween; and a shielding electrode, disposed on the common electrode and the gate electrode, wherein an orthographic projection of a first end of the shielding electrode on the substrate is overlapped with an orthographic projection of the gate electrode on the substrate, another orthographic projection of a second end opposite to the first end of the shielding electrode on the substrate is overlapped with an orthographic projection of the common electrode on the substrate, and thereby the spacing is covered by the shielding electrode; and the shielding electrode is electrically connected to the common electrode.

18. The display device according to claim 17, wherein the array substrate further comprises:
- a passivation layer, located between the shielding electrode and the common electrode; and
- wherein the pixel electrode is disposed in a same layer as the shielding electrode and insulated from the shielding electrode.

19. The display device according to claim 18, wherein the array substrate further comprises:
- an insulating layer, located between the common electrode and the gate electrode;
- wherein the passivation layer is provided with a via structure, and the common electrode and the shielding electrode are electrically connected with each other through the via structure.

20. The display device according to claim 18, wherein the array substrate further comprises:
- an insulating layer, located between the shielding electrode and the common electrode;
- wherein the passivation layer and the insulating layer are provided with a via structure, and the common electrode and the shielding electrode are electrically connected with each other through the via structure;
- wherein the common electrode is disposed in a same layer as the gate electrode.

* * * * *